Jan. 21, 1964 P. E. LANDSEM 3,118,635
LINE REELING CONTROL MEANS
Filed Nov. 13, 1962
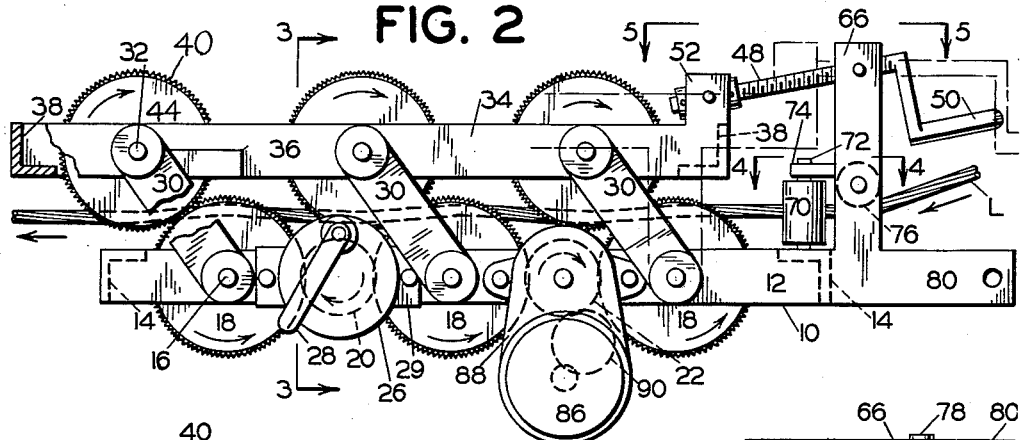
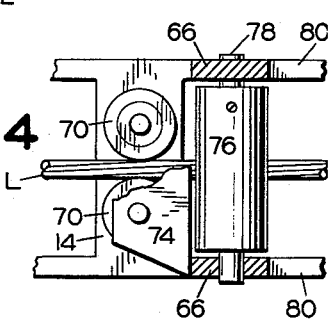
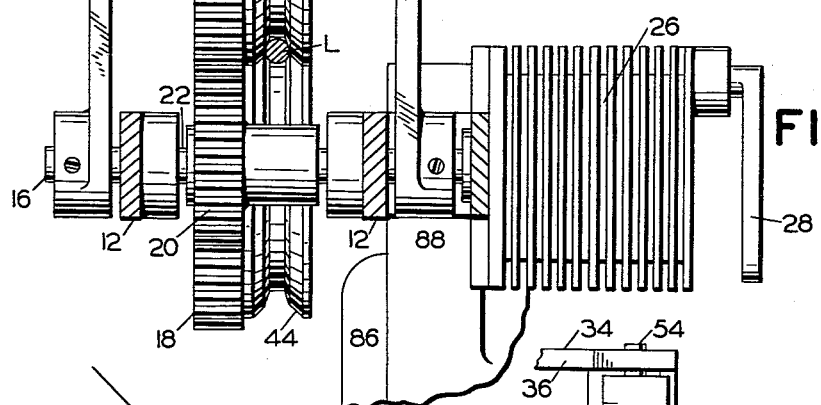
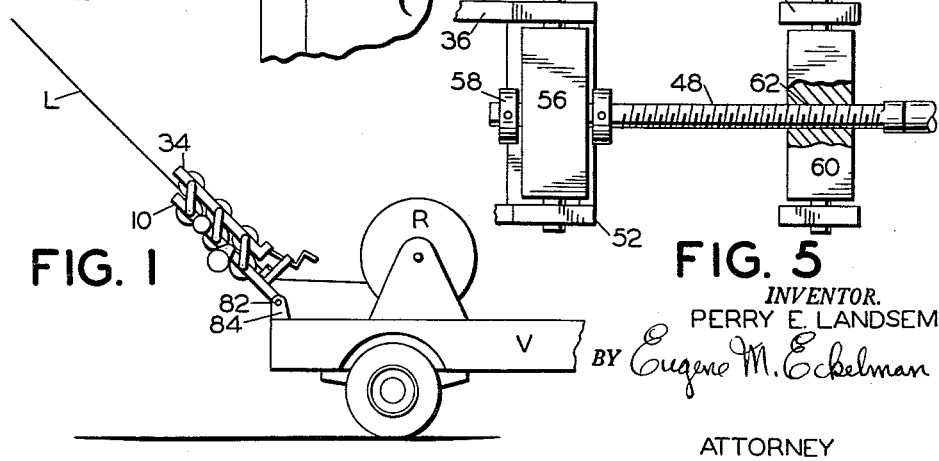
INVENTOR.
PERRY E. LANDSEM
BY Eugene M. Eckelman
ATTORNEY United States Patent Office 3,118,635
Patented Jan. 21, 1964

3,118,635
LINE REELING CONTROL MEANS
Perry E. Landsem, 4527 SE. Ivon, Portland 6, Oreg.
Filed Nov. 13, 1962, Ser. No. 236,910
3 Claims. (Cl. 242—154)

This invention relates to line reeling control means and is particularly applicable in combination with apparatus for the stringing of heavy lines such as electric or telephone lines or cables.

In the stringing of lines on poles, for example electric lines, it is customary to attach pulleys to the cross arm of the poles and reeve the line loosely therethrough. The line is fed from a reel at the stringing end and is tied to a pulley or other tightening mechanism at the other end. When the line is tightened, the reel must be securely anchored and held non-rotatably which has heretofore required heavy duty, expensive mechanism.

Accordingly it is the primary object of the present invention to provide line reeling control means which is of simplified construction and which is operative on the line independently of the reel.

Another object is to provide line reeling control means which accomplishes an efficient and positive braking of line mounted therein and more particularly line reeling control means having novel brake means employing longitudinally spaced pairs of friction sheaves and structure operative therewith to provide controlled movement of the line therethrough.

Another object is to provide line reeling control means of the type described which is conveniently operable by a single workman.

Still another object is to provide line reeling control means employing in combination therewith drive means which may be utilized if desired to drive line therethrough.

Briefly stated, the present control means employs a base member rotatably supporting a plurality of lower braking gears disposed in spaced relation on the base and rotatably connected by idler gears. A carrier frame is supported on the base frame by pivotal links and this frame carries a plurality of upper braking gears arranged in meshing relation with respective ones of the lower braking gears and adapted for movement with the carrier in longitudinal adjusting direction. Each of the upper and lower braking gears carries a friction sheave thereon and these sheaves are longitudinally aligned for receiving a line therethrough. The carrier is movable longitudinally on its links by drive means, such as screw means, and in such longitudinal movement has positions of different coaction with the line, i.e., to allow free passage of the line through the friction sheaves, to allow a restrained or braking operation of the line therethrough, or to firmly anchor the line therein. The braking operation is accomplished by suitable brake means incorporated in the gear assembly. The present invention also incorporates drive means for the gear assembly whereby instead of applying a braking force to the line, a driving force may be applied thereto.

The invention will be better understood and additional objects thereof will become more apparent from the accompanying specification and claims considered together with the accompanying drawings, wherein like numerals of reference indicate like parts, and wherein:

FIGURE 1 is a fragmentary elevational view of a vehicle on which a reel carrying heavy line and the present control means are mounted;

FIGURE 2 is a side elevational detail view of the present control means;

FIGURE 3 is an enlarged fragmentary sectional view taken on the line 3—3 of FIGURE 2;

FIGURE 4 is an enlarged fragmentary sectional view taken on the line 4—4 of FIGURE 2; and FIGURE 5 is an enlarged fragmentary plan view with parts broken away, taken on the line 5—5 of FIGURE 2.

Referring particularly to the drawings, the present line reeling control means comprises a base 10 having a pair of longitudinal frame members 12 integrated by transverse frame members 14. Rotatably supported on transverse shafts 16 are lower braking gears 18 disposed in longitudinally spaced and longitudinally aligned relation and interconnected for unitary and similar rotation by intermediate idler gears 20 supported on transverse shafts 22. Three gears 18 are depicted for illustrative purposes only, and more or less of said gears may be utilized.

One of the shafts 22, comprising the lefthand shaft in FIGURE 2, is associated with a brake mechanism 26 operated by a control handle 28. More particularly this shaft 22 extends outwardly and projects into the brake mechanism which may be of conventional construction such as disclosed and described in U.S. Patent No. 1,978,974 to Williams. Since this shaft is a braking shaft, it is necessary that its idler gear 20 be keyed thereto. Brake 26 has a mounting plate 29 by means of which it is secured to one of the side frames 12 of the base 10.

Shafts 16 are of a length to extend outwardly beyond the sides of frame members 12, and supported on these shaft extensions are link arms 30 connected to transverse shafts 32 rotatably mounted in a carrier frame 34 having a pair of longitudinal frame members 36 integrated by transverse frame members 38. Rotatably supported on shafts 32 intermediate the frame members 36 are gears 40 which may or may not be of identical size as gears 18. Gears 40 mesh with respective ones of the lower gears. Thus upon longitudinal pivotal movement of carrier 34 on the links 30, gears 40 roll over gears 18 and in such movement establish wire reeling and wire braking functions.

As best apparent in FIGURE 3, each of the gears 18 and 40 has an integral friction sheave 44 on one side thereof, these sheaves being of slightly less diameter than the diameter of the gears to allow for the reception of a line L therein. It is apparent that upon positioning a line in the sheaves 44 of the lower gears 18 and upon longitudinally moving the carrier 34 to a position wherein the sheaves on the gears 40 overlap somewhat the sheaves on the gears 18, the line will be crimped and frictionally gripped by all of said sheaves, as shown in FIGURE 1, either to control movement of the line through the device or to anchor it, depending upon the overlapping distance of the two sets of friction sheaves.

Thus, longitudinal positioning of the carrier 34 controls the functioning of the present device and such longitudinal positioning is accomplished by a screw 48 having a crank handle 50. The forward end of carrier 34 has a pair of upturned ears 52 between which is supported, by stub shafts 54, FIGURE 5, a block 56 bored to receive freely the end of screw 48. Set collars 58 are secured to the screw 48 on opposite sides of the block 56 to provide a push or pull connection with the carrier. Also associated with screw 48 is a block 60 having a threaded bore 62 which is threadedly engaged by said screw. Block 60 has stub shafts 64 for pivotal support in a pair of upright integral arms 66 on the base 10.

By means of the structure just described turning of the screw 48 causes it to move axially relative to the block 60 which of course operates to move the carrier 34 longitudinally, FIGURE 2 illustrating in full lines an extended braking position and illustrating in broken lines a retracted free reeling position.

Fair lead means are provided at the forward end of the present device. Such means comprises a pair of transversely spaced vertical rollers 70 pivotally supported on shafts 72 mounted at their upper ends in a rearwardly extending ear 74 on the arms 66 and at their lower ends in transverse frame member 14. The fair lead means also employs a horizontal roller 76 supported on a shaft 78 mounted between the pair of arms 66, such roller preferably being located such that the bottom surface thereof is in substantially the same plane as the uppermost edges of the sheaves 44 on the bottom gears 18.

In the operation of the present device, the screw 48 is retracted to its dotted line position and the free end of the line L is reeved through the friction sheaves 44 of the gears 18. This position of the carrier 34 may be maintained as long as free reeling operation is desired but when it is desired to decrease the reeling speed of the line or to stop it altogether, the screw 48 is operated to extend the carrier and move the friction sheaves 44 on the gears 40 to an overlapping relation with the sheaves on the gears 18 to accomplish the desired braking.

FIGURE 1 is illustrative of the present device in operation wherein it is supported on a vehicle V to receive line from a reel R also supported on the vehicle. It is preferred to provide a pivotal mounting of the present device on the vehicle and for this purpose the forward end of the base 10 has side frame extensions 80 and such extensions are apertured for the reception of a shaft 82 mounted in suitable ears 84 on the vehicle. Thus the present device automatically adjusts itself so as to be linearly disposed in the direction of line being paid out.

Also utilized in combination with the present control means is a drive motor 86 the output shaft of which drives a gear reduction unit 88 secured to the base 10. The gears 90 of reduction unit 88 operatively mesh with shaft 22 of the other idler gear, comprising the righthand idler gear as viewed in FIGURE 2. While motor 86 is inoperative in most operations, it may be energized to drive this idler gear and therefore the entire set of gears on the base 10 when it is desired that the line L be driven through the control means. For such driving operation, the carrier is extended to a position to provide a friction grip of the line between the upper and lower friction sheaves.

It is to be understood that the form of my invention herein shown and described is to be taken as a preferred example of the same and that various changes in the shape, size and arrangement of parts may be resorted to without departing from the spirit of my invention or the scope of the subjoined claims.

Having thus described my invention, I claim:

1. Line reeling control means comprising a base member, a carrier disposed in parallel, spaced relation with said base member, link means pivotally connecting said carrier to said base member for longitudinal, variable spacing movement of said carrier relative to said base member, at least two pairs of meshing gears one of which gears in each pair is on the base member and the other of which gear in each pair is on the carrier, the gears on the carrier having rolling engagement with the gears on the base member in the longitudinal variable spacing movement of said carrier relative to said base member, idler gear means meshing between the gears on one of said base member and carrier for providing unitary rotation of all said gears, longitudinally aligned friction sheave means connected for rotation with each of said gears, the sheaves on the base member being arranged to support a line in longitudinal edge relation thereon and the sheaves on the carrier being movable into overlapping relation with the sheaves on the base member upon selected movement of said carrier toward said base member for crimping a line supported on the sheaves on the base member to frictionally grip the line, and brake means operable on one of said sheaves for controlling rotation of the latter.

2. Line reeling control means comprising a base member, at least two first gears rotatably mounted on said base member in longitudinal edge alignment but spaced from each other, an idler gear rotatably mounted on said base member and meshing with both of said first gears to connect said latter gears for unitary rotation in the same direction, a carrier disposed in parallel, spaced relation relative to said base member, link means pivotally connecting said carrier to said base member for longitudinal, variable spacing movement of said carrier relative to said base member, at least two second gears rotatably mounted on said carrier, each of said latter gears being in mesh with a respective one of said first gears for rolling engagement therewith in the longitudinal variable spacing movement of said carrier, longitudinally aligned first friction sheave means connected with said first gears for rotation therewith and arranged to support a line in longitudinal edge relation thereon, longitudinally aligned second friction sheave means connected with said second gears for rotation therewith, the second sheave means being arranged to move toward and away from said first friction sheave means in the longitudinal variable spacing movement of said carrier for movement into and out of overlapping relation with said first friction sheave means for crimping a line supported across said first sheaves to frictionally grip the line, and brake means connected with one of said first and second friction sheaves for controlling rotation of said sheaves.

3. The line reeling control means of claim 2 including drive means connected between said base member and said carrier for moving said carrier in its longitudinal variable spacing movement.

References Cited in the file of this patent

UNITED STATES PATENTS 2,999,655     Petersen et al.           Sept. 12, 1961

FOREIGN PATENTS 77,272     Austria                July 25, 1919